Aug. 3, 1965  B. CLIN  3,198,044
GLASS CUTTING APPARATUS
Filed May 31, 1962  5 Sheets-Sheet 1

INVENTOR.
BERNARD CLIN
BY Bauer and Seymour
ATTORNEYS

Aug. 3, 1965  B. CLIN  3,198,044
GLASS CUTTING APPARATUS
Filed May 31, 1962  5 Sheets-Sheet 2

INVENTOR.
BERNARD CLIN
BY Bauer and Seymour
ATTORNEYS

INVENTOR.
BERNARD CLIN
BY Bauer and Seymour
ATTORNEYS

INVENTOR.
BERNARD CLIN
BY Bauer and Seymour
ATTORNEYS

INVENTOR.
BERNARD CLIN

BY Bauer and Seymour
ATTORNEYS

United States Patent Office 3,198,044
Patented Aug. 3, 1965

3,198,044
GLASS CUTTING APPARATUS
Bernard Clin, Seine, France, assignor to Compagnie de Saint-Gobain, Neuilly-sur-Seine, France
Filed May 31, 1962, Ser. No. 198,950
Claims priority, application France, June 7, 1961, 864,141
15 Claims. (Cl. 83—10)

The present invention relates to apparatus for making transverse and longitudinal cutting or score lines on a moving sheet of glass by means of tools such as diamond or roller tools, thereby permitting glass panels of various dimensions to be cut from the sheet.

The apparatus of the invention includes a bridge disposed above the moving sheet of glass, there being tools mounted on the bridge, for making transversal and longitudinal cuts or score marks, the transverse scores being made when the bridge travels longitudinally as a unit with the sheet of glass during displacement of the latter, and the longitudinal score marks being made when the bridge is being moved longitudinally with respect to the sheet of glass toward a position corresponding to a new transverse cut or score line on the sheet in advance of the one previously made.

The improvement in accordance with the invention particularly includes novel mechanisms for mounting the cutting tools on the bridge, such mechanisms permitting each one of the tools to be brought to its line of cut or to be retracted from such line of cut to allow the passage of the other tool. Other characteristics of the invention will appear in the following description which is given by way of non-limiting example of a glass-cutting apparatus in accordance with the invention.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views.

Figure 4:
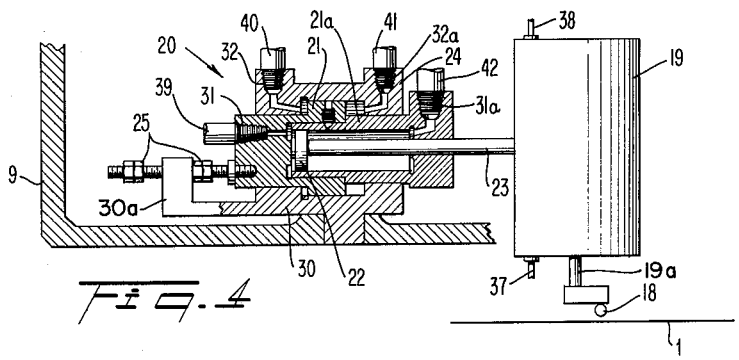
Figure 5:
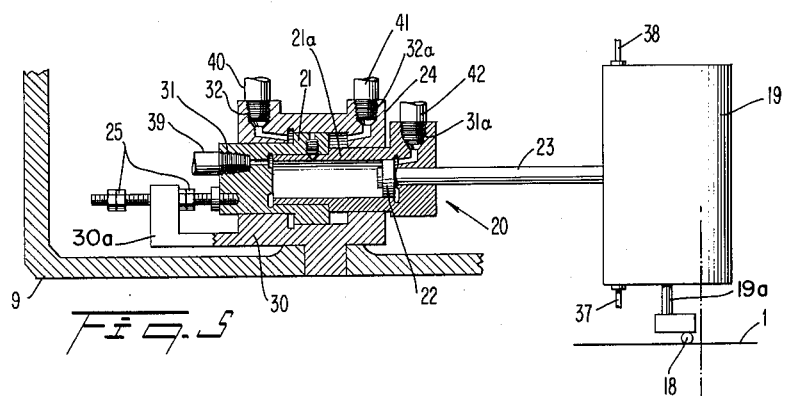
Figure 6:
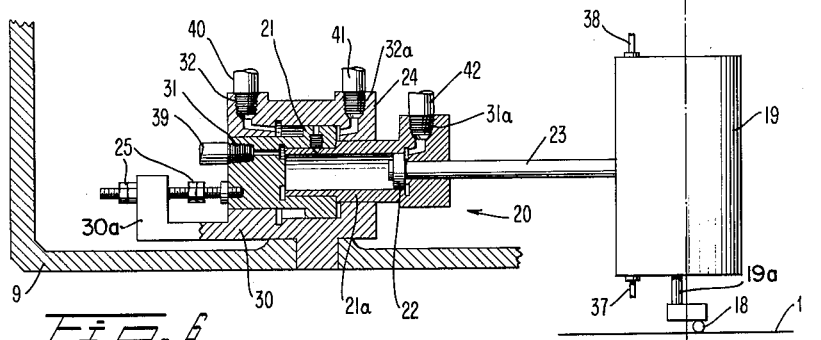
Figure 7:
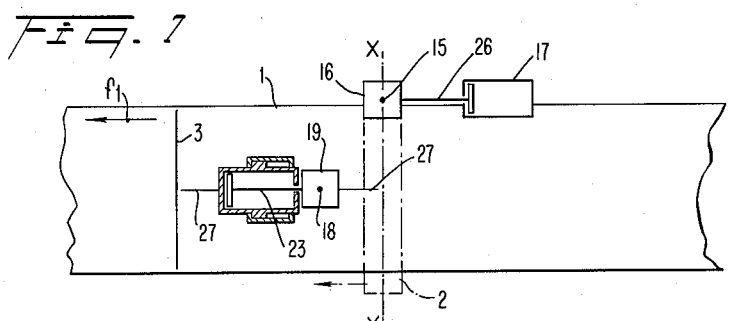
Figure 8:
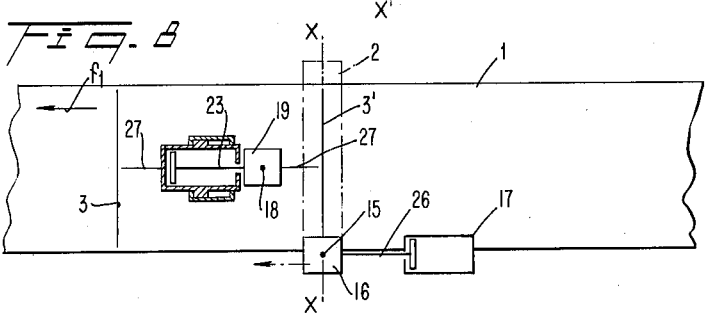
Figure 9:
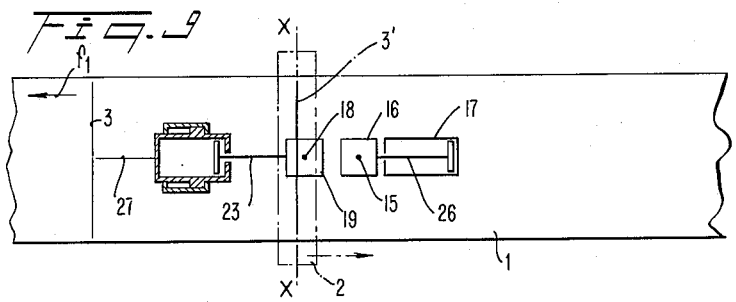
Figure 10:
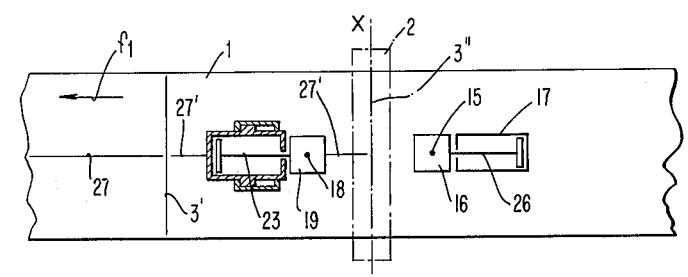
Figure 11:
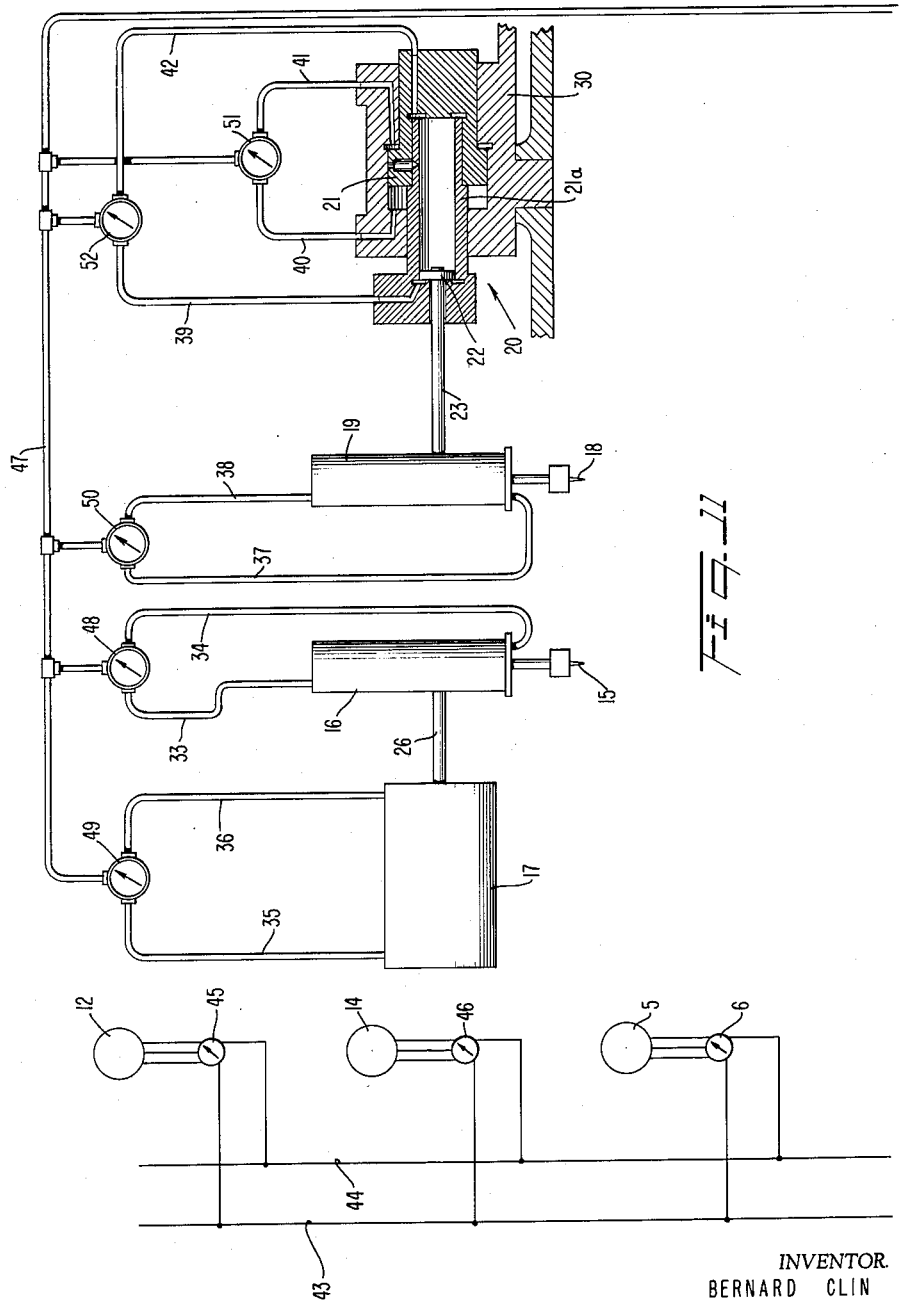

FIGS. 4, 5 and 6 are three schematic views of mechanism for mounting the longitudinal cutting tool, such mechanism including a double action cylinder which may be operated to move the longitudinal scoring tool in horizontal directions, FIG. 4 showing the longitudinal cutting tool retracted and elevated into inoperative position, and FIGS. 5 and 6 showing the tool lowered into operative position with respect to the glass in positions at the end and the beginning of a longitudinal cut, respectively;

FIG. 7 is a schematic view in plan of the apparatus showing the relative locations of the transversal and longitudinal cutting tools at the beginning of the formation of a transverse score line on a sheet of glass;

FIG. 8 is a view similar to FIG. 7 but with the parts of the apparatus in the positions which they occupy at the completion of a cutting stroke by the transversal cutting tool;

FIG. 9 is a view similar to FIGS. 7 and 8 with the elements of the apparatus in the positions which they occupy at the beginning of a longitudinal cutting operation;

FIG. 10 is a view similar to FIG. 9 but with the elements of the apparatus in the positions which they occupy after a longitudinal cutting stroke has been made and the longitudinal cutting tool has been retracted to permit the transverse cutting tool to pass the longitudinal cutting tool in making the next transverse cut; and FIG. 11 is a schematic view of the mechanism for driving and controlling the various elements of the apparatus.

In the drawings, the reference character 1 represents a ribbon of glass which is travelling in the direction $f_1$ under a transverse bridge 2, the bridge being able to be selectively driven in the opposite direction, designated $f_2$, by a reversible electric motor 5 (FIG. 11). The bridge 2, which is made of metal and is mounted at its ends on carriages 4, 4', is displaceable along parallel rails 7, 7' above the glass by driving means including motor 5, a speed reducer mechanism driven thereby, and a driven pinion meshing with a rack on one of the rails. The bridge 2 supports movable carriages 8 and 9 by means of rails 10 and 11, respectively, fixed to and extending along opposite sides of the bridge 2. The carriage 8, which carries the transverse cutting tool, is driven by a gearmotor 12 affixed to the bridge, motor 12 being connected to drive a chain 13, one run of which is secured to carriage 8. The carriage 9, which carries the longitudinal cutting tool, supports at its upper end a gearmotor 14 to which is affixed a friction wheel 14'. Wheel 14' carries a pneumatic tire which has frictional contact with the exterior of the beam which constitutes bridge 2.

Figure 2:
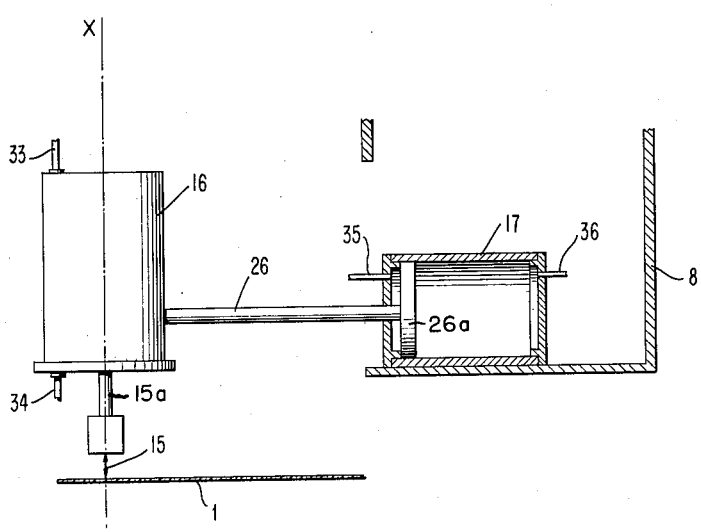
FIG. 2 is a schematic view of mechanism for mounting the transverse cutting tool on the bridge, such tool being shown in its operative position with respect to the sheet of glass.
Figure 3:
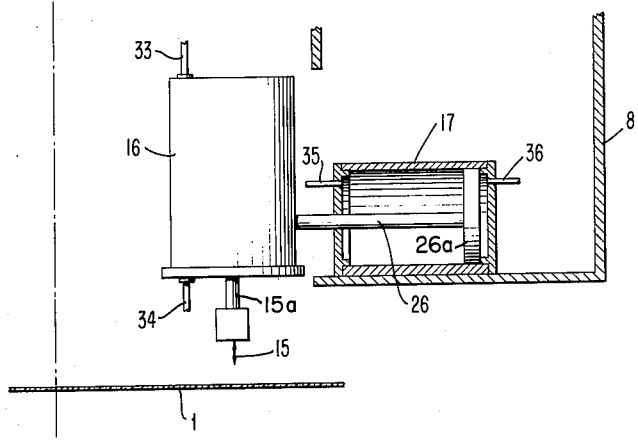
FIG. 3 is a view similar to FIG. 2 but with the transverse cutting tool elevated into an inoperative position and retracted from the line of cutting of the transverse tool.

The carriage 8 is provided at its lower end with a transversal scoring or tracer tool 15 which is moved vertically by a piston rod 15a connected with a piston within cylinder 16 and which provides the necessary pressure of the tool against the glass to score the latter. The cylinder 16 is attached to the outer end of a piston rod 26 of a horizontal cylinder 17 fixed to carriage 8, and is thus horizontally movable by cylinder 17 in such manner that the tool may be advanced into and retracted from the cutting position, that is to say, into and away from the vertical median plane passing through the axis of bridge 2. FIGURE 2 shows the positions wherein pressure fluid introduced through pipe 36 into cylinder 17 has forced piston 26a and rod 26 to their leftwardmost position to thus move tool 15 into the median plane of the bridge, identified by the line x—x, and wherein pressure fluid introduced into cylinder 16 through pipe 33 has forced the piston in cylinder 16, and rod 15a, downwardly so that tool 15 is in cutting contact with sheet 1. FIGURE 3 shows the position wherein pressure fluid introduced through pipe 34 into cylinder 16, below the piston therein, has elevated tool 15 free of sheet 1, and pressure fluid introduced into cylinder 17, through pipe 35, has retracted tool 15 upstream from the aforesaid median plane, where it is out of the path of movement of the tool for making longitudinal cuts, namely, tool 18.

In a similar manner, referring to FIGURES 4, 5 and 6, carriage 9 is provided at its lower end with a longitudinally acting tracer or scoring tool 18. Tool 18 is moved vertically by a piston in cylinder 19, connected with rod 19a, and which thrusts the tool against the glass with the required cutting pressure. Cylinder 19 is connected to the outer end of a piston rod 23 of a horizontal double cylinder generally designated 20, and is thus displaceable horizontally thereby. Mechanism 20 is composed of two cylinders telescoped one within the other. The first cylinder is made up of a two-part body 21a fixed together by set screw 21b and having a piston 22 fixed to the aforesaid rod 23. The body 21a has an annular flange 21 thereon, body 21a and flange 21 being so made as to serve as the piston of a second cylinder 24. The length of stroke of body 21a in cylinder 24 is regulated by the adjustable abutment nuts 25 on a stop rod passing with a smooth fit through a member 30a affixed to carriage 9.

Cylinder 20 may be made of two assembled aligned parts, in which the piston 22 reciprocates. The second cylinder 24 has a piston made up of two assembled aligned bodies. The assembled double piston is fixedly mounted on the carriage 9 by a housing member 30.

Movement of the piston 22 and its rod 23 in and relatively to cylinder 21a, is caused by introducing fluid under pressure into one or the other of the ports 31, 31a. Movement of the cylinder 21a is caused by the introduction of fluid under pressure through one or the other of the ports 32, 32a.

Figure 1:
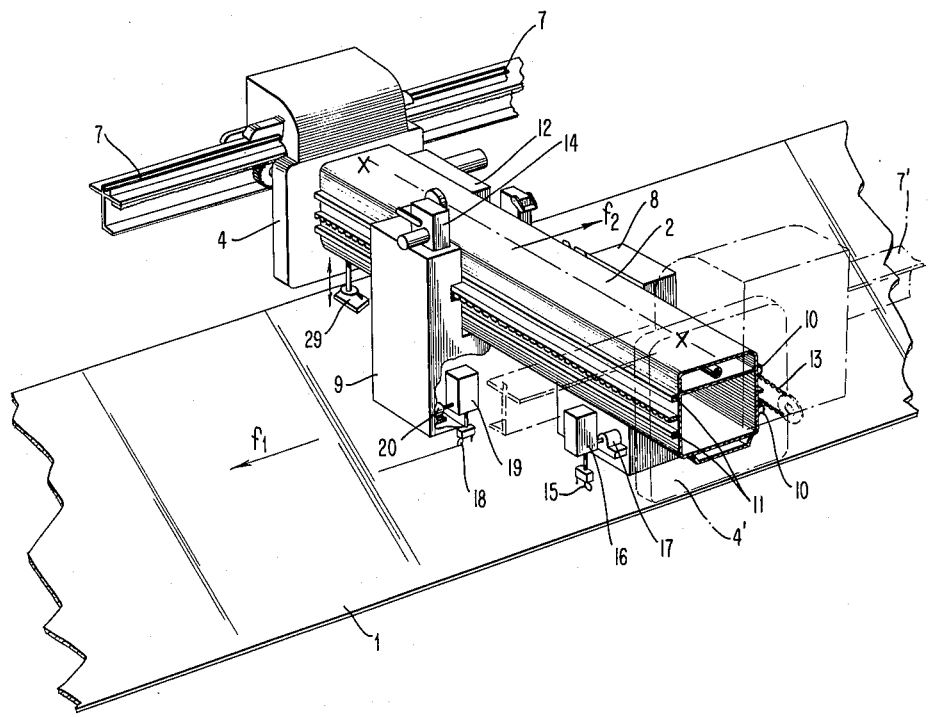
FIG. 1 is a view in perspective of a glass sheet or ribbon travelling in a direction from right to left, there being shown in cooperation with the glass a transverse bridge having carriages supporting the cutting tools and the means whereby the tools are moved and controlled.

FIGS. 7–10, inclusive, show schematically four essential positions occupied by salient parts of the apparatus during its operation. In the first position, shown in FIG. 7, tool 15 and the cylinder 16 are in the median plane of the bridge 2, that is, a vertical plane through the axis $x$—$x$ of the bridge. The piston of cylinder 17 is in its advanced position, as shown in FIG. 2, and the piston of cylinder 16 is applying its tool to the sheet of glass. The bridge 2 is connected to the sheet of glass to travel therewith in the direction of the arrow $f_1$, for example by means of a suction cup 29 (FIG. 1) connected to the bridge and applied to the glass. The carriage 8 is moved from one edge (FIG. 7) of the sheet of glass to the other (FIG. 8) by being driven by chain 13, which in turn is driven by motor 12. The tool 15 thus traces a transverse score line 3′ during such travel. In such first position, the piston of cylinder 19 has elevated the tool 18 vertically out of contact with the glass, and piston 22 has retracted the tool from the median plane of the bridge, so that tool 18 and cylinder 19 are in the positions shown in FIG. 4.

In the third position, shown in FIG. 9, the cylinder 17 has retracted the tool 15 to the right out of the median plane, and the cylinder 16 has raised tool 15 so that such tool is now in the position shown in FIG. 3. The carriage 8 carrying cylinder 17 and tool 15 may thus be returned to its initial position without interfering with tool 18. Tool 18 is positioned at the beginning of the longitudinal score line which it is to make by admitting pressure fluid through pipe 40 to thus move cylinder 21a and all parts carried thereby into the starting point, that is, the position of FIG. 6, wherein tool 18 is a little in advance of the last transverse score line. Cylinder 19 applies the tool 18 to the sheet of glass with the desired pressure. Gripper 29 is then removed from glass sheet 1 and the bridge 2 is now moved to the right by motor 5 incorporated therein in the direction of the arrow $f_2$, the bridge being guided upon rails 7, 7′ as it moves. The tool 18, which is then fixed to the bridge, forms a longitudinal score or cut 27′ in the sheet of glass.

Simultaneously, pressure fluid is introduced through pipe 41 to move piston 21, cylinder 21a and all parts carried thereby, relatively to cylinder 24 into the position shown in FIG. 5 to position tool 18, so that when it has completed its longitudinal cut it will be a short distance downstream from the location of the next transverse cut. In FIG. 10 the apparatus is shown with its parts in the positions which they occupy after the tool 18 has completed its longitudinal cut, and the cylinder 19 has been retracted by the piston 22 and its rod 23 of the cylinder 20. Such new transverse cut will then be traced by tool 15, after tool 18 has been retracted to its inoperative position, when the cylinder 17 will have been returned into its first position, that is, that of FIGS. 2 and 7.

For the purpose of illustration, a simple manually operated control system for the described apparatus is shown in FIG. 11. In such figure, each of reversible electric motors 5, 12, and 14 is shown as being fed from a pair of direct current-supplying wires 43, 44 through manually operated on, off, and reversing switches 6, 45, and 46, respectively. Each of fluid motors 16, 17, 19, 20 and 21 is shown as being connected to a suitable source 47 of fluid pressure, such as compressed air, through conventional throttling and reversing valves 48, 49, 50, 51 and 52, respectively. The above-described operation of the three electric motors and five fluid motors can thus readily be obtained by suitable manipulation of the switches and valves. It may be preferred in some instances to interconnect various ones of the switches and valves by suitable linkages, mechanical or electrical, whereby sequential operation of the switches and valves, in the carrying out of a regular program of glass cutting according to a predetermined plan may be simplified.

The above-described embodiment of the invention may also be provided with automatic control mechanisms so that the apparatus follows a predetermined program. Such control mechanism may include electro-magnetically controlled valves which control the admission of fluid into the various cylinders of the apparatus. Thus, the apparatus may readily be made to perform a pre-established program of operations automatically.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

Two or several longitudinal cutting tools identical with cutting tool 18 can be used simultaneously.

I claim:

1. Apparatus for cutting an elongated sheet of glass moving in the direction of its length, comprising a transverse bridge disposed on one side of the sheet of glass and selectively movable parallel to the sheet in the same direction as and opposite to the direction of travel of the glass, means mounting a first, transverse cutting, glass cutting tool on the bridge for selective travel in opposite directions along the bridge to cut the glass along lines transversely of the sheet of glass, means mounting a second, longitudinally cutting, glass cutting tool on the bridge for adjustment longitudinally of the bridge, and means selectively to present the second tool to the glass and to retract the tool therefrom so that the second tool forms a longitudinal cut in the glass when presented to the glass and the bridge is moved longitudinally with respect to the glass.

2. Apparatus in accordance with claim 1, comprising means selectively to drive the bridge at the same speed and direction as the moving sheet of glass and to drive the bridge in the direction opposite the direction of movement of the glass.

3. Apparatus in accordance with claim 2, wherein the position of the second tool at the beginning of its cutting stroke lies close to the line of cut of the first tool, and the respective means mounting the first and second tools each includes means which selectively moves the respective tool parallel to the path of the glass into its cutting line and retracts the tool parallel to the path of the glass from such line to permit the passage of the other tool along the bridge.

4. Apparatus in accordance with claim 3, wherein the cutting line of the first, transverse cutting tool lies at least near a transverse plane normal to the sheet of glass and passing through the longitudinal axis of the bridge, and comprising means selectively to advance the second, longitudinal cutting tool with respect to the bridge opposite the direction of travel of the glass to a location upstream of such transverse plane and to retract the second tool downstream of such transverse plane.

5. Apparatus in accordance with claim 4, comprising means selectively to advance the first, transverse cutting tool toward and into engagement with the glass and to retract it away from the glass, and wherein the means selectively to advance and retract the tools parallel to the glass into and out of their lines of cut each includes a reciprocable fluid motor having a part reciprocable parallel to the surface of the glass and parallel to the longitudinal axis of the glass, each of the tools and the means for advancing the tool toward and retracting the tool from the glass being connected to and supported by the reciprocable part of its respective reciprocable fluid motor.

6. Apparatus in accordance with claim 5, wherein each of the means for advancing each of the respective tools toward and retracting the tool from the glass is a further reciprocable fluid motor, each of said further reciprocable fluid motors being secured to and supported by the reciprocable part of its respective first-recited fluid motor.

7. Apparatus in accordance with claim 5, wherein the first-recited fluid motor for selectively moving the second, longitudinal cutting glass cutting tool upstream and downstream of the said transverse plane normal to the glass is a double cylinder reciprocable fluid motor having a first cylinder supported by and reciprocable with respect to a second cylinder and a second cylinder mounted on and supported by means on the bridge which travels along the bridge to adjust the transverse positioning of the second tool, the first cylinder having said reciprocable part to which the second tool and its means for advancing such tool toward and retracting it from the glass are attached.

8. Apparatus in accordance with claim 7, comprising adjustable means for limiting the length of travel of the first cylinder with respect to the second cylinder.

9. Apparatus in accordance with claim 7, wherein the first cylinder is telescopically mounted within the second cylinder.

10. Apparatus in accordance with claim 9, comprising adjustable stop means for limiting the length of travel of the first cylinder with respect to the second cylinder.

11. Apparatus in accordance with claim 10, wherein the adjustable stop means comprises a rod affixed to and reciprocable with the first cylinder, spaced adjustable first abutments on the rod, and a second abutment fixed with respect to the second cylinder located between the spaced first abutments for selective engagement therewith.

12. Apparatus for cutting an elongated sheet of glass moving in a path in the direction of its length, comprising, a bridge disposed above said glass transversely thereof, means mounting said bridge for selective movement parallel to the glass sheet in the same direction as and opposite to the direction of travel of said glass sheet, a first glass cutting tool movably mounted on said bridge, means for moving said first tool along said bridge and transversely of said sheet of glass, means for selectively moving said bridge at the same speed and direction as said sheet of glass, a second glass cutting tool movably mounted on said bridge, first means for moving said second tool along said bridge transversely of said sheet and independently of said first tool, second means for moving said second tool toward and away from said bridge parallel with said sheet and into and out of the path of movement of said first cutting tool in movement along said bridge, and means to move said bridge in a direction opposite to the movement of said sheet of glass.

13. The apparatus of claim 12, and means for moving said second tool toward and from said bridge, parallel with the sheet, through a predetermined distance independently of said second means.

14. In an apparatus for scoring along lines transversely and longitudinally thereof, a ribbon-like sheet of glass moving in the direction of its length, a bridge, means mounting said bridge over and transversely across the sheet parallel therewith for selective translation parallel to the sheet in the same direction as and opposite to the direction of travel of the sheet, said bridge having a central horizontal axis transversely of and parallel to the sheet and defining a median plane normal to the sheet, first and second cutting tools, means operable to move each said tool in first movement on and along said bridge transversely of the sheet and independently of the other, parallel with said plane, means operable to move each said tool in second movement relatively to said bridge into contact with and away from the sheet and independently of the other, means mounting each said tool for third movement relatively to said bridge and independently of the other, from a first position in said plane to a second position out of said plane, said second positions being respectively on opposite sides of said plane, means to selectively move said bridge at the same speed and in the same direction as the sheet, means to move said bridge in a direction opposite to the direction of movement of the sheet, and power means selectively operable to impart to each said tool, independently of the other, said first, second and third movements.

15. The apparatus of claim 14, and means operable to move said second tool a predetermined distance normal to said plane and independently of said third movement imparted thereto by said power means.

References Cited by the Examiner

UNITED STATES PATENTS

| | | | |
|---|---|---|---|
| 1,946,356 | 2/34 | Owen | 225—96.5 |
| 2,747,280 | 5/56 | Kurata | 83—10 |
| 2,783,837 | 3/57 | Bridges | 83—44 X |
| 2,793,471 | 5/57 | Kurata | 225—96.5 |
| 2,948,991 | 8/60 | Walters et al. | 225—96.5 |

ANDREW R. JUHASZ, *Primary Examiner.*

WILLIAM W. DYER, Jr., *Examiner.*